US011510036B2

United States Patent
Shin

(10) Patent No.: US 11,510,036 B2
(45) Date of Patent: Nov. 22, 2022

(54) APPARATUS FOR SETTING CONTROL AUTHORITY FOR SMART HOME AND METHOD THEREOF

(71) Applicants: HYUNDAI MOTOR COMPANY, Seoul (KR); KIA MOTORS CORPORATION, Seoul (KR)

(72) Inventor: Yong Woo Shin, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 223 days.

(21) Appl. No.: 16/869,146

(22) Filed: May 7, 2020

(65) Prior Publication Data
US 2021/0110934 A1  Apr. 15, 2021

(30) Foreign Application Priority Data
Oct. 15, 2019  (KR) .................. 10-2019-0128059

(51) Int. Cl.
*H04W 4/44* (2018.01)
*G16Y 40/35* (2020.01)
*G16Y 40/50* (2020.01)
*G16Y 30/10* (2020.01)

(52) U.S. Cl.
CPC .............. *H04W 4/44* (2018.02); *G16Y 30/10* (2020.01); *G16Y 40/35* (2020.01); *G16Y 40/50* (2020.01)

(58) Field of Classification Search
None
See application file for complete search history.

(56) References Cited

U.S. PATENT DOCUMENTS

2014/0306833 A1* 10/2014 Ricci ...................... B60R 25/00
340/901
2017/0203767 A1*  7/2017 Tibbitts ................. H04W 48/04

* cited by examiner

*Primary Examiner* — Walter J Divito
(74) *Attorney, Agent, or Firm* — Morgan, Lewis & Bockius LLP

(57) ABSTRACT

An apparatus for setting control authority for a smart home is provided. The apparatus includes an information collector that collects driving information and registration information of each vehicle registered in one account from a car-to-home service system, and a controller that sets control authority for one smart home to one vehicle based on the driving information and registration information collected by the information collector.

12 Claims, 5 Drawing Sheets

APPARATUS FOR SETTING CONTROL AUTHORITY FOR SMART HOME AND METHOD THEREOF

CROSS-REFERENCE TO RELATED APPLICATION

The present application claims priority to and the benefit of Korean Patent Application No. 10-2019-0128059, filed on Oct. 15, 2019, which is incorporated herein by reference in its entirety.

TECHNICAL FIELD

The present disclosure relates to a technology capable of providing a car-to-home service for a plurality of smart homes for a plurality of vehicles registered with one account (ID) without a control authority conflict (multiple vehicles control one smart home).

BACKGROUND

The statements in this section merely provide background information related to the present disclosure and may not constitute prior art.

In general, a smart home refers to a technology that connects all devices in various fields, such as home appliances (e.g., TVs, air conditioners, refrigerators, and the like), energy consumption devices (e.g., water supply, electricity, heating and cooling, and the like), security devices (e.g., door locks, surveillance cameras, and the like), and the like, through a communication network to monitor and control the devices.

In such a smart home, a smartphone or artificial intelligence (AI) speaker may recognize a voice of a user, connect all Internet-of-things (IoT) devices in a house, and automatically operate or be remotely controlled corresponding to user characteristics. Starting with remote control, the smart home has been evolved in the direction that AI learns the situation and user preferences and provides the results accordingly.

Recently, there has been commercialized a car-to-home service that can control the IoT devices in the smart home which are previously registered by a driver in a vehicle (e.g., Hyundai Motor Kona Hybrid®).

According to such a car-to-home service, because a user can register only one vehicle with a single account, and can also control only one smart home from the registered vehicle, the user owning a plurality of vehicles cannot register all his vehicles with a single account, and cannot register a plurality of smart homes such as an office, a work room, a house, and the like as control targets.

In particular, when a car-to-home service user can register a plurality of vehicles and register a plurality of smart homes, there has been no discussion of how to set up control authority for the plurality of smart homes targeting the plurality of vehicles registered with one account.

SUMMARY

An aspect of the present disclosure provides an apparatus for setting control authority for a smart home and a method thereof, which can be applied to a system for providing car-to-home services for a plurality of smart homes to a plurality of vehicles and can provide the car-to-home services for the plurality of smart homes to the plurality of vehicles registered in one account (ID) without conflicts in control authority by setting the control authority for a smart home to one vehicle based on the driving information of each vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for setting control authority for a smart home includes an information collector that collects driving information and registration information of each vehicle registered in one account from a car-to-home service system, and a controller that sets control authority for one smart home to one vehicle based on the driving information and registration information collected by the information collector.

The driving information may include at least one of navigation destination information, a destination arrival estimated time, and current location information, and the registration information may include vehicle information and smart home location information corresponding to the one account.

The controller may assign control authority for a first smart home to a vehicle that sets the first smart home as a destination.

The controller may assign control authority to a vehicle which is closest to the first smart home when the vehicle that sets the first smart home as the destination does not exist.

The controller may assign control authority for the first smart home to a vehicle having a shortest estimated time of arrival in the first smart home when a plurality of vehicles set the first smart home as the destination, The information collector may collect the driving information and the registration information of each vehicle registered in the one account from a service server in the car-to-home service system.

The information collector may collect the driving information and the registration information of each vehicle registered in the one account from a contents provider (CP) server in the car-to-home service system.

The apparatus may further include a display that displays which of vehicles registered by a user has the control authority for each smart home registered by the user.

According to an aspect of the present disclosure, a method of setting control authority for a smart home includes collecting, by an information collector, driving information and registration information of each vehicle registered in one account from a car-to-home service system, and setting, by a controller, control authority for one smart home to one vehicle based on the driving information and registration information collected by the information collector.

The driving information may include at least one of navigation destination information, a destination arrival estimated time, and current location information, and the registration information may include vehicle information and smart home location information corresponding to the one account.

The setting of the control authority may include assigning control authority for a first smart home to a vehicle that sets the first smart home as a destination, assigning control authority to a vehicle which is closest to the first smart home when the vehicle that sets the first smart home as the destination does not exist, and assigning control authority for the first smart home to a vehicle having a shortest estimated time of arrival in the first smart home when a plurality of vehicles set the first smart home as the destination.

The collecting of the driving information and the registration information may include collecting the driving information and the registration information of each vehicle registered in the one account from a service server in the car-to-home service system.

The collecting of the driving information and the registration information may include collecting the driving information and the registration information of each vehicle registered in the one account from a contents provider server in the car-to-home service system.

The method may further include displaying, by a display, which of vehicles registered by a user has the control authority for each smart home registered by the user.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
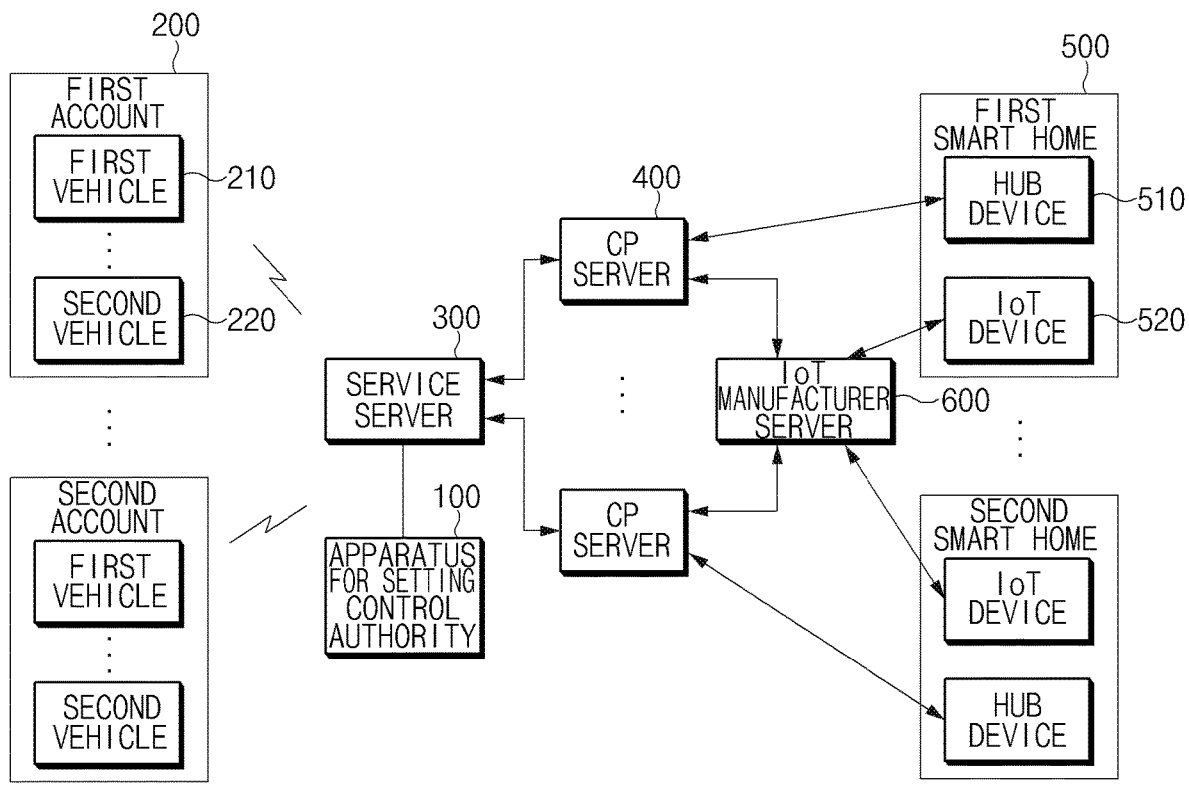
FIG. 1 is a view illustrating the configuration of a car-to-home service system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating the configuration of a car-to-home service system in some forms of the present disclosure.

As shown in FIG. 1, a car-to-home service system in some forms of the present disclosure may include a first account 200, a service server 300, a content provider (CP) server 400, a first smart home 500, and an IoT manufacturer server 600. In this case, for the sake of understanding, the first account 200 and the first smart home 500 will be described as an example, but the number of accounts and the number of smart homes may be implemented in plural.

Regarding each component, the first account 200 may include a plurality of vehicles 210 and 220. That is, a user may register the plurality of vehicles 210 and 220 with the first account 200. In this way, each user may register a unique number, a MAC address, or the like for the plurality of vehicles owned by the user with one account.

The service server 300, which is a server to which a head unit provided in the vehicle is connected through a mobile communication network to receive the car-to-home service, performs a function of controlling IoT devices and hub devices in the smart home, which are registered in advance in cooperation with each CP server 400 in response to a request from the head unit. An apparatus 100 for setting control authority of a smart home in some forms of the present disclosure is connected to the service server 300 to collect the driving information (navigation destination information, estimated time of arrival at a destination, current location information, and the like) and registration information (vehicle information by account, smart home location information by account, and the like) of each of vehicles 210 and 220 registered in the first account 200. In this case, the destination information and the location information may be, for example, GPS location information.

The CP server 400 may be provided in plural, and may serve to communicate with a plurality of hub devices 510 and the IoT manufacturer server 600 in the first smart home 500. The apparatus 100 for setting control authority of a smart home in some forms of the present disclosure may be connected to the CP server 400 to collect the driving information (navigation destination information, estimated time of arrival at a destination, current location information, and the like) and registration information (vehicle information by account, smart home location information by account, and the like) of each vehicle 210 or 220 registered in the first account 200. In this case, the destination information and the location information may be, for example, GPS location information.

The first smart home 500 refers to a home, an office, a work room, or the like including the plurality of hub devices 510 and a plurality of IoT devices 520.

The IoT manufacturer server 600, which is a server operated by the manufacturer that manufactures the IoT device 520, performs a function of communicating with the IoT device 520. In this case, a plurality of IoT manufacturer servers may be provided for each manufacturer. In addition, the CP server 400 may perform the function of the IoT manufacturer server 600.

Figure 2:
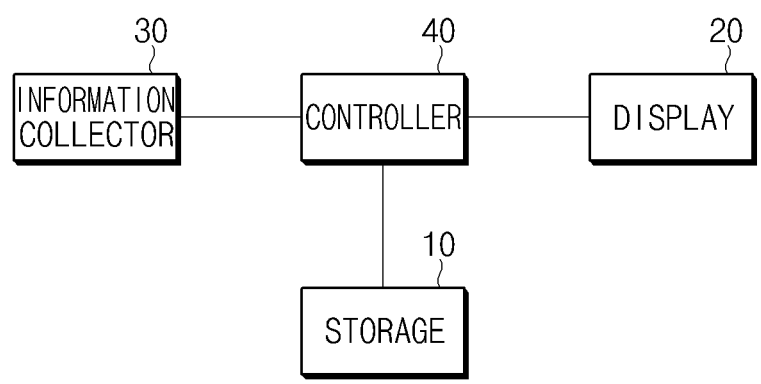
FIG. 2 is a view illustrating an apparatus for setting control authority of a smart home in one form of the present disclosure.

FIG. 2 is a view illustrating an apparatus for setting control authority of a smart home in some forms of the present disclosure.

As shown in FIG. 2, the apparatus 100 for setting control authority of a smart home in some forms of the present disclosure may include storage 10, a display 20, an information collector 30, and a controller 40. In this case, according to a scheme of implementing the apparatus 100 for setting control authority of a smart home in some forms of the present disclosure, each component may be combined with each other to be implemented as one, and some components may be omitted.

Regarding each component, first, the storage 10 may store various logic, algorithms and programs required in a process of setting control authority of one smart home to one vehicle based on the driving information of each vehicle applied to the car-to-home system to be registered with one account.

The storage 10 may store various types of information collected by the information collector 30.

The storage 10 may store a threshold distance that is one of the criteria for assigning the control authority for the first smart home 500.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

The display 20 may be implemented with a cluster, a head up display (HUD), an audio video navigation (AVN) system, or the like, and may provide various information generated in the car-to-home service process or generated in the process of setting control authority of a smart home to a user.

In particular, the display 20 may display which of the vehicles registered by the user the control authority of each smart home registered by the user is assigned to.

The information collector 30 may collect the driving information (navigation destination information, estimated time of arrival at a destination, current location information, and the like) and the registration information (vehicle information by account, smart home location information by account, and the like) of each vehicle 210 or 220 registered in the first account 200 from the service server 300.

The information collector 30 may collect the driving information (navigation destination information, estimated time of arrival at a destination, current location information, and the like) and the registration information (vehicle information by account, smart home location information by account, and the like) of each vehicle 210 or 220 registered in the first account 200 from the CP server 400.

The information collector 30 may be implemented as a module providing a connection interface with the service server 300 or the CP server 400. In this case, the function of the information collector 30 may be implemented to be performed by the controller 40. Hereinafter, as an example, the information collector 30 that collects various information from the service server 300 will be described.

The controller 40 performs the overall control such that each component can perform its function. The controller 40 may be implemented in the form of hardware or software, or may be implemented in the form of a combination of hardware and software. Preferably, the controller 40 may be implemented with a microprocessor, but is not limited thereto.

In particular, the controller 40 may perform various controls required in the operations of setting the control authority of one smart home based on the driving information and registration information of each vehicle applied to the car-to-home system to be registered with one account.

When each vehicle 210 or 220 registered in the first account 200 is connected to the service server 300, the controller may activate the information collector 30 to allow the information collector 30 to collect the driving information (navigation destination information, estimated time of arrival at a destination, current location information, and the like) and the registration information (vehicle information by account, smart home location information by account, and the like) of each vehicle 210 or 220 from the service server 300.

The controller 40 may set the control authority of one smart home to one vehicle based on the driving information and the registration information of each vehicle 210 or 220 collected by the information collector 30.

The controller 40 may preferentially assign the control authority to the vehicle that sets the first smart home 500 as a destination. When there is no vehicle that sets the first smart home 500 as a destination, the controller 40 may assign the control authority to the vehicle which is closest to the first smart home 500. In this case, the vehicles means vehicles registered with one account.

When there are a plurality of vehicles that set the first smart home 500 as a destination, the controller 40 may assign the control authority for the first smart home 500 to the vehicle having the shortest estimated time of arrival in the first smart home 500.

Hereinafter, a scheme of setting control authority by the controller 40 will be described in detail with reference to FIGS. 3 to 4.

Figure 3:
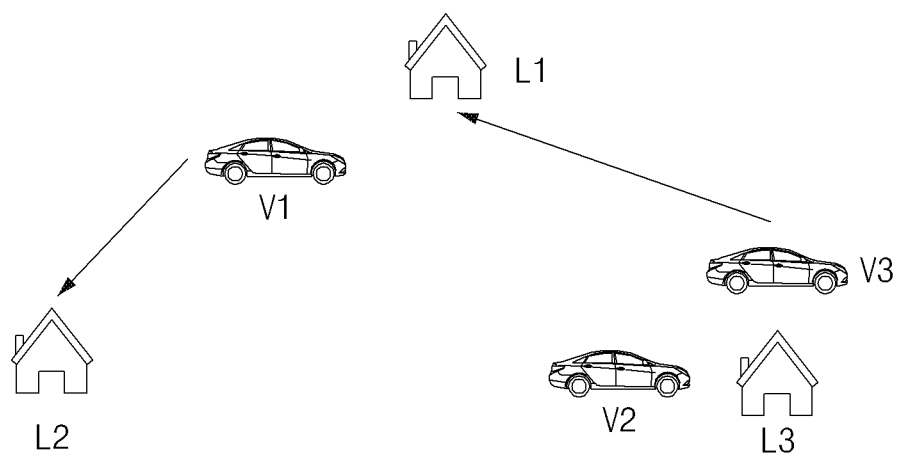
FIG. 3 is a view illustrating a scheme in which a controller, which is provided in an apparatus for setting control authority of a smart home in one form of the present disclosure, sets control authority for each smart home for each vehicle registered in one account.

FIG. 3 is a view illustrating a scheme in which a controller, which is provided in an apparatus for setting control authority of a smart home according to an form of the present disclosure, sets control authority for each smart home for each vehicle registered in one account.

In FIG. 3, a plurality of vehicles V1, V2 and V3 and a plurality of smart homes L1, L2 and L3) are registered in one account by the user.

For example, when the first vehicle V1 is moving after setting the second smart home L2 as a destination, the second vehicle V2 is moving without setting the destination, and the third vehicle V3 is moving after setting the first smart home L1 as a destination, the controller 40 assigns the control authority for the first smart home L1 to the third vehicle V3, assigns the control authority for the second smart home L2 to the first vehicle V1, and assigns the control authority for the third smart home L3 to the second vehicle V2.

That is, because the controller 40 considers the destination setting information as the highest priority, the controller 40 assigns the control authority for the second smart home L2 to the first vehicle V1 that sets the second smart home L2 as a destination, assigns the control authority for the first smart home L1 to the third vehicle V3 that sets the first smart home L1 as a destination, and assigns the control authority for the third smart home L3 to the second vehicle V2 that is closest to the third smart home L3 because there is no vehicle that sets the third smart home L3 as a destination. In this case, although the third vehicle V3 is also located close to the third smart home L3, the third vehicle V3 is excluded because the first smart home L1 is already set as a destination.

Figure 4:
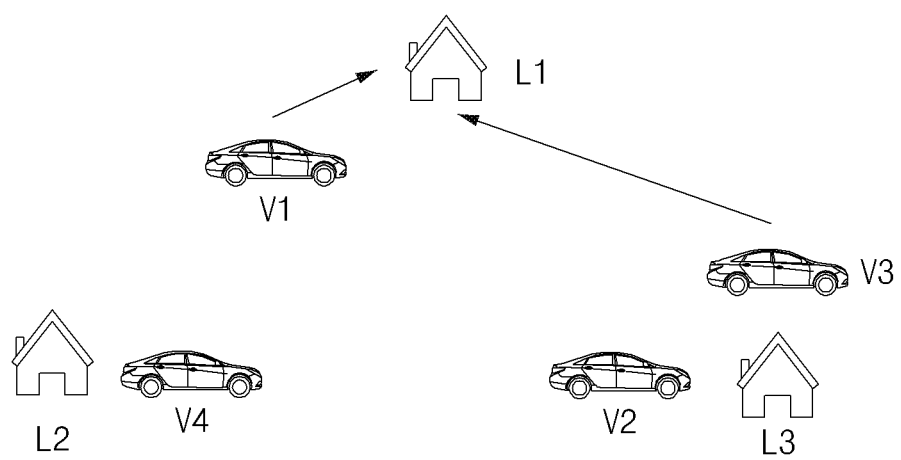
FIG. 4 is a view illustrating a scheme in which a controller, which is provided in an apparatus for setting control authority of a smart home in one form of the present disclosure, sets control authority for each smart home for each vehicle registered in one account.

FIG. 4 is a view illustrating a scheme in which a controller, which is provided in an apparatus for setting control authority of a smart home in some forms of the present disclosure, sets control authority for each smart home for each vehicle registered in one account.

In FIG. 4, a plurality of vehicles V1, V2, V3 and V4 and a plurality of smart homes L1, L2 and L3 are registered in one account by the user.

For example, when the first vehicle V1 is moving after setting the first smart home L1 as a destination, the second and fourth vehicles V2 and V4 are moving without setting the destinations, and the third vehicle V3 is moving after setting the first smart home L1 as a destination, the controller 40 assigns the control authority for the first smart home L1 to the first vehicle V1, assigns the control authority for the second smart home L2 to the fourth vehicle V4, and assigns the control authority for the third smart home L3 to the second vehicle V2.

That is, because the first and third vehicles V1 and V3 set the first smart home L1 as the destinations, the controller 40 assigns the control authority for the first smart home L1 to the first vehicle V1 that has a short estimated time of arrival in the first smart home L1.

In addition, because there is no vehicle that sets the second and third smart homes L2 and L3 as a destination, the controller 40 assigns the control authority for the second smart home L2 to the fourth vehicle V4 that is closest to the second smart home L2 and assigns the control authority for the third smart home L3 to the second vehicle V2 that is closest to the third smart home L3.

Figure 5:
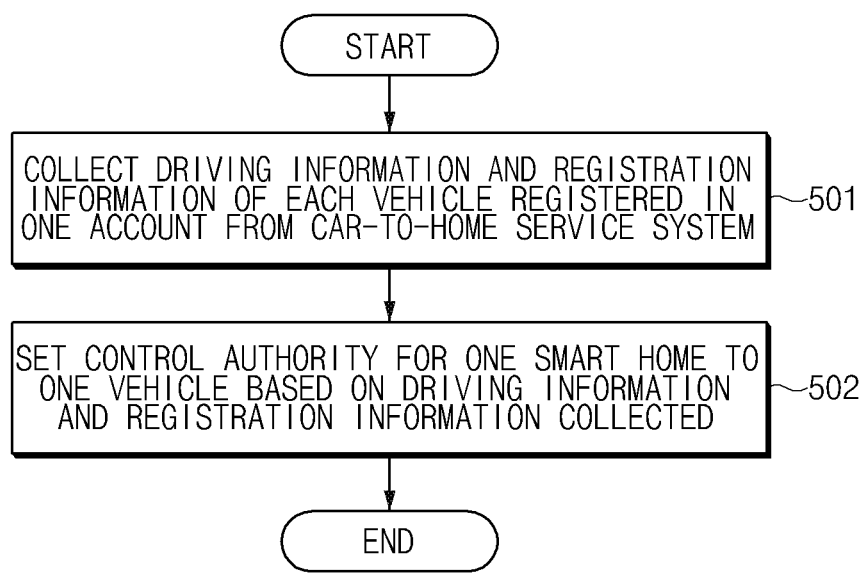
FIG. 5 is a flowchart illustrating a method of setting control authority for a smart home in one form of the present disclosure.

FIG. 5 is a flowchart illustrating a method of setting control authority for a smart home in some forms of the present disclosure.

First, in operation 501, the information collector 30 collects the driving information and the registration information of each vehicle registered in one account from the car-to-home service system.

Then, in operation 502, the controller 40 sets the control authority for one smart home to one vehicle based on the driving information and the registration information collected by the information collector 30. That is, the controller 40 assigns the control authority for the first smart home to the vehicle that sets the first smart home as the destination, and assigns the control authority for the first smart home to the vehicle that is closest to the first smart home when there is no vehicle that sets the first smart home as a destination. When a plurality of vehicles set the first smart home as the destinations, the controller 40 assigns the control authority to the first smart home to the vehicle that has the shortest estimated time of arrival in the first smart home.

In some forms of the present disclosure, an apparatus for setting control authority for a smart home and a method thereof may be applied to a system for providing car-to-home services for a plurality of smart homes to a plurality of vehicles and may provide the car-to-home services for the plurality of smart homes to the plurality of vehicles registered in one account (ID) without conflicts in control authority by setting the control authority for a smart home to one vehicle based on the driving information of each vehicle.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for setting control authority for a smart home, the apparatus comprising:
    an information collector configured to collect driving information and registration information of each vehicle registered in one account from a car-to-home service system; and
    a controller configured to set control authority for one smart home to one vehicle based on the collected driving information and the collected registration information,
    wherein the controller is configured to assign control authority for a first smart home to a vehicle that sets the first smart home as a destination, and
    wherein the controller is configured to assign control authority to a vehicle which is closest to the first smart home when the vehicle that sets the first smart home as the destination does not exist.

2. The apparatus of claim 1,
    wherein the driving information includes at least one of navigation destination information, a destination arrival estimated time, or current location information, and
    wherein the registration information includes vehicle information and smart home location information corresponding to the one account.

3. The apparatus of claim 1, wherein the controller is configured to assign control authority for the first smart home to a vehicle having a shortest estimated time of arrival in the first smart home when a plurality of vehicles set the first smart home as the destination.

4. The apparatus of claim 1, wherein the information collector is further configured to collect the driving information and the registration information of each vehicle registered in the one account from a service server in the car-to-home service system.

5. The apparatus of claim 1, wherein the information collector is further configured to collect the driving information and the registration information of each vehicle registered in the one account from a contents provider server in the car-to-home service system.

6. The apparatus of claim 1, wherein the apparatus further includes:
    a display configured to display the registered vehicles when the registered vehicle has the control authority for each smart home registered by a user.

7. A method of setting control authority for a smart home, the method comprising:
    collecting, by an information collector, driving information and registration information of each vehicle registered in one account from a car-to-home service system; and
    setting, by a controller, control authority for one smart home to one vehicle based on the collected driving information and the collected registration information,
    wherein the setting of the control authority includes:
    assigning control authority for a first smart home to a vehicle that sets the first smart home as a destination; and assigning control authority to a vehicle which is closest to the first smart home when the vehicle that sets the first smart home as the destination does not exist.

8. The method of claim 7,
wherein the driving information includes at least one of navigation destination information, a destination arrival estimated time, or current location information, and
wherein the registration information includes vehicle information and smart home location information corresponding to the one account.

9. The method of claim 8, wherein the setting of the control authority further includes:
assigning control authority for the first smart home to a vehicle having a shortest estimated time of arrival in the first smart home when a plurality of vehicles set the first smart home as the destination.

10. The method of claim 7, wherein the collecting of the driving information and the registration information includes collecting the driving information and the registration information of each vehicle registered in the one account from a service server in the car-to-home service system.

11. The method of claim 7, wherein the collecting of the driving information and the registration information includes collecting the driving information and the registration information of each vehicle registered in the one account from a contents provider server in the car-to-home service system.

12. The method of claim 7, wherein the method further includes:
displaying, by a display, the registered vehicle when the registered vehicle has the control authority for each smart home registered by a user.

* * * * *